(12) United States Patent
Fagen et al.

(10) Patent No.: US 6,681,241 B1  
(45) Date of Patent: Jan. 20, 2004

(54) RESOURCE CONTENTION MONITORING EMPLOYING TIME-ORDERED ENTRIES IN A BLOCKING QUEUE AND WAITING QUEUE

(75) Inventors: Scott A. Fagen, Poughkeepsie, NY (US); Jeffrey M. Nick, West Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/373,402

(22) Filed: Aug. 12, 1999

(51) Int. Cl.⁷ .................................................. G06F 9/00
(52) U.S. Cl. ........................ 709/104; 709/102; 709/100
(58) Field of Search ................................ 709/104, 100, 709/226

(56) References Cited

U.S. PATENT DOCUMENTS

| | | | |
|---|---|---|---|
| 4,189,771 A | 2/1980 | Roever ........................ 364/300 |
| 4,318,182 A | 3/1982 | Bachman et al. ........... 364/200 |
| 4,494,193 A | 1/1985 | Brahm et al. ............... 364/200 |
| 5,016,167 A | 5/1991 | Nguyen et al. ............. 364/200 |
| 5,095,421 A | 3/1992 | Freund ....................... 395/650 |
| 5,303,368 A | * 4/1994 | Kotaki .......................... 707/8 |
| 5,428,757 A | * 6/1995 | Sutton ........................ 709/107 |
| 5,440,743 A | 8/1995 | Yokota et al. .............. 395/650 |
| 5,442,763 A | 8/1995 | Bartfai et al. .............. 395/375 |
| 5,444,705 A | 8/1995 | Olnowich et al. ......... 370/85.6 |
| 5,459,871 A | * 10/1995 | Van Den Berg ............ 709/104 |
| 5,542,088 A | * 7/1996 | Jennings et al. ........... 709/103 |
| 5,583,992 A | 12/1996 | Kudo .................... 395/200.03 |
| 5,590,335 A | 12/1996 | Dubourreau et al. ........ 393/704 |
| 5,680,402 A | 10/1997 | Olnowich et al. .......... 370/498 |
| 5,682,537 A | 10/1997 | Davies et al. .............. 395/726 |
| 5,701,439 A | 12/1997 | James et al. .................. 703/17 |
| 5,711,010 A | 1/1998 | Naddell et al. ............. 455/509 |
| 5,764,976 A | 6/1998 | Hsiao ......................... 395/608 |
| 5,835,766 A | 11/1998 | Iba et al. .................... 395/679 |
| 5,845,117 A | 12/1998 | Fujita ......................... 395/677 |
| 5,982,749 A | * 11/1999 | Daniel et al. ............... 709/250 |
| 6,148,278 A | 11/2000 | Castaldo, Jr. ................ 703/26 |
| 6,151,655 A | 11/2000 | Jones et al. ................. 710/244 |
| 6,182,246 B1 | * 1/2001 | Gregory et al. .............. 714/38 |
| 6,189,007 B1 | 2/2001 | Boonie et al. ................. 707/8 |
| 6,223,200 B1 | 4/2001 | Barnes et al. .............. 709/100 |
| 6,401,110 B1 | * 6/2002 | Freitas et al. .............. 709/104 |

OTHER PUBLICATIONS

"Deadlocks", Modern Operating Systems, Andrew S. Tanenbaum, 1992, Chapter 6, pp. 240–262.

Resource Class Independent Deadlock Detection, IBM Technical Disclosure Bulletin, vol. 26, No. 1, Jun. 1983, pp. 434–435.

Method for Distributed Deadlock Detection, IBM Technical Disclosure Bulletin, vol. 23, No. 6, Nov. 1980, pp. 2534–2537.

(List continued on next page.)

*Primary Examiner*—David Wiley  
*Assistant Examiner*—Joseph E. Avellino  
(74) *Attorney, Agent, or Firm*—William A. Kinnaman, Jr.; Kevin P. Radigan; Heslin Rothenberg Farley & Mesiti P.C.

(57) ABSTRACT

Resource contention monitoring and analysis are provided for a single system or multi-system environment. Resource contention is tracked at a task level when contention occurs by listing each owner of a resource in a blocker list and each waiter for the resource in a waiter list. Each list is ordered oldest to newest so each instance of contention is added to the end of the respective list. The resource request and contention lists are cross-linked to provide easy coordination between the resource queues and the contention lists. Techniques for analyzing contention using the lists, including deadlock analysis, are described.

31 Claims, 7 Drawing Sheets

OTHER PUBLICATIONS

Deadlock Detection For All Resource Classes, IBM Technical Disclosure Bulletin, vol. 22, No. 11, Apr. 1980, pp. 5078–5079.

Tabular Approach to Deadlock Detection In A Multiprocessor and Multiprogramming Environment, IBM Technical Disclosure Bulletin, vol. 31, No. 1, Jun. 1988, pp. 88–91.

Using Hashing To Reduce Communication In Distributed Deadlock Detection Algorithms, IBM Technical Disclosure Bulletin, vol. 32, No. 9A, Feb. 1990, pp. 278–279.

Deadlock Detection Using Only Thread Identifiers, IBM Technical Disclosure Bulletin, vol. 39, No. 1, Jan. 1996, pp. 29–30.

Deadlock Detect Algorithm, IBM Technical Disclosure Bulletin, vol. 26, No. 4, Sep. 1983, pp. 1858–1860.

Algorithm for Detection of System Deadlocks, IBM Technical Disclosure Bulletin, Jul. 1969, pp. 357–359.

Deadlock Detection and Breaking, IBM Technical Disclosure Bulletin, May 1971, pp. 3799–3800.

Deadlock Detecting Enqueue Dequeue, IBM Technical Disclosure Bulletin, Jan. 1971, pp. 2338–2339.

Deadlock Detector, IBM Technical Disclosure Bulletin, Aug. 1977, pp. 1210–1211.

Detection of Deadlocks in Decision Free Systems, IBM Technical Disclosure Bulletin, Jul. 1974, pp. 463–465.

Deadlock/Interlock Detection, IBM Technical Disclosure Bulletin, Sep. 1973, pp. 1243–1244.

Early Deadlock Detection Mechanism, IBM Technical Disclosure Bulletin, Jan. 1978, pp. 3063–3065.

Multiple Owner Multiple Level Deadlock Detection Mechanism for Resource Contention Control, IBM Technical Disclosure Bulletin, Jan. 1978, pp. 3066–3069.

Communication Protocol for Deadlock Detection in Computer Networks, IBM Technical Disclosure Bulletin, Mar. 1974, pp. 3471–3481.

* cited by examiner

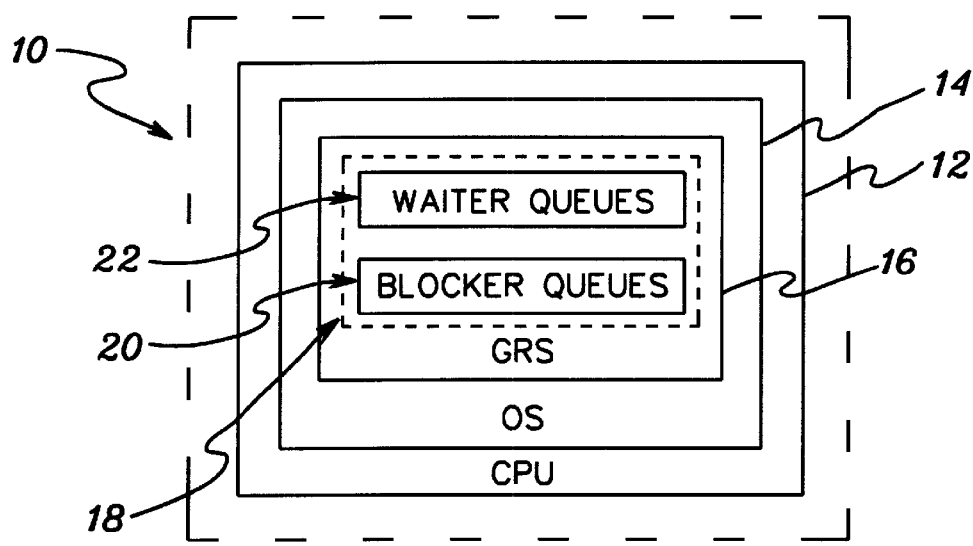
fig. 1
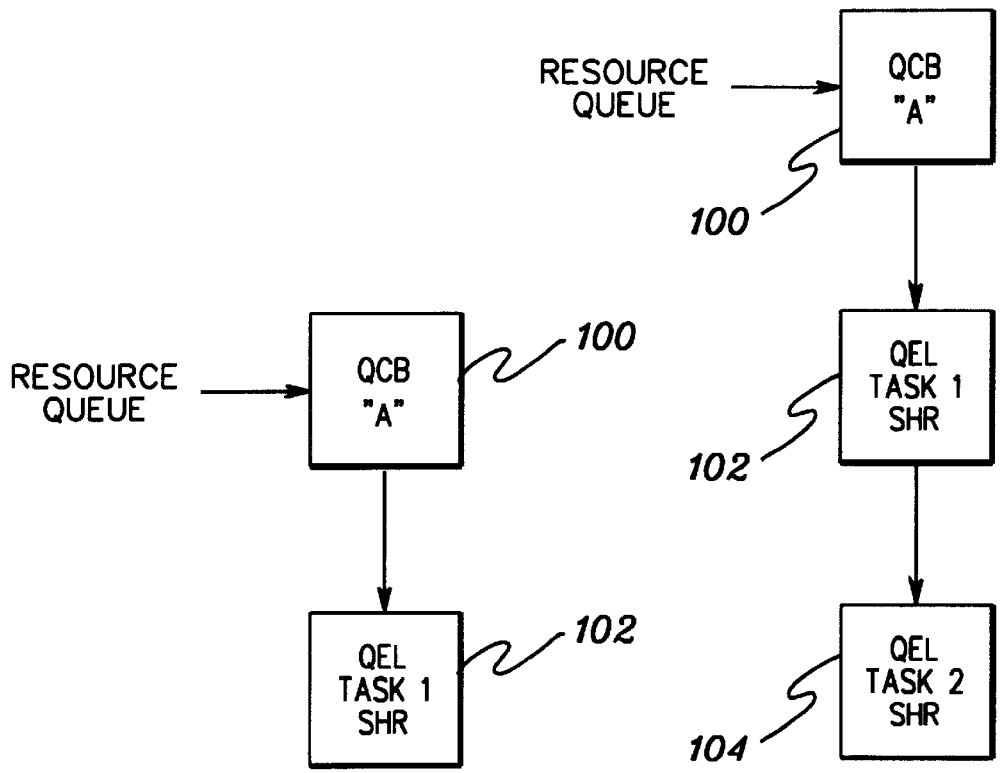
fig. 3
fig. 4

RESOURCE CONTENTION MONITORING EMPLOYING TIME-ORDERED ENTRIES IN A BLOCKING QUEUE AND WAITING QUEUE

CROSS-REFERENCE TO RELATED APPLICATION

This application contains subject matter which is related to the subject matter of the following application, which is assigned to the same assignee as this application and filed on the same day as this application. The below-listed application is hereby incorporated herein by reference in its entirety:

"RESOURCE CONTENTION ANALYSIS EMPLOYING TIME-ORDERED ENTRIES IN A BLOCKING QUEUE AND WAITING QUEUE," by Fagen et al., Ser. No. 09/373,164.

TECHNICAL FIELD

This invention relates to the monitoring and control of concurrent processes in a multiprocessing, multiprogramming computing environment, and more particularly, to detection and monitoring of resource contention between multiple processes thereof.

BACKGROUND OF THE INVENTION

As used herein, the term "computing environment" includes any single system or multi-system computing environment as available or known in the art. A "task" or "process" means an independent unit of work that can complete for the "resources" of a computing environment. A "task control block" is a consolidation of control information pertaining to a task including any user-assigned priority and its state, i.e., active or waiting. The "wait state" is a condition of a task that is dependent upon the execution of other tasks in order for the "waiting" task to become "active".

Also in this specification, a "resource" is any facility of a computing environment or of an "operating system" running thereon which is required for the execution of a task. Typical resources include main store, input/output devices, the central processing unit (CPU), data sets, and control or processing programs. In this regard, an "operating system" is a set of supervisory routines running on a computing system for providing, for example, one or more of the following functions: determining the order in which requesting tasks or their computations will be carried out, providing long-term storage of data sets including programs, protecting data sets from unauthorized access or usage, and/or system logging and recovery.

"Multiprogramming" which pertains to the concurrent execution of two or more programs by a computing environment, can be managed on a computer running under, for example, OS/390 offered by International Business Machines Corporation. Modern operating systems, by permitting more than one task to be performed concurrently, make possible more efficient use of resources. For example, if a program that is being executed to accomplish a task must be delayed (for instance, until more data is read into the CPU), then performance of some other completely independent task may proceed. The CPU can execute another program or even execute the same program so as to satisfy another task.

In today's computing environments, mutual exclusion (or resource serialization) is often provided within the operating system itself. With IBM's OS/390 system, a customer has the option of configuring a multi-image environment to increase capacity and enhance availability. To allow these images to co-exist, resources shared between systems need to be serialized to ensure integrity. OS/390 uses a Global Resource Serialization (GRS) component to serialize both single system and multi-system resources. These resources can number in the thousands, if not millions. For more information on GRS reference an IBM publication entitled "OS/390 MVS Planning: Global Resource Serialization"; doc. #GC28-1759-OS (September, 1998) (6th edition), the entirety of which is hereby incorporated herein by reference.

In the allocation and use of these resources, contention for a resource can occasionally cause progress of the workload to be negatively impacted for a number of reasons. For example: (1) a resource allocation deadlock might occur; (2) a long-running task might hold a resource (resource starvation); or (3) a task holding resources may have ceased to respond ("enabled hang").

A task is said to be "deadlocked" if its progress is blocked indefinitely because it is stuck in a "circular wait" upon other tasks. In this circumstance, each task is holding a "non-preemptable" resource which must be acquired by some other task in order to proceed, i.e., each task in the circle is waiting upon some other task to release its claim on a resource. The characteristics of deadlock then are mutual exclusion, non-preemption, and resource waiting. In the case of resource starvation, a long-running task or job holds one or more critical resources, in which case, workload also requiring that resource(s) must wait until the job ends. In severe cases, software errors can cause tasks that hold resources to fail without ending, causing the resource to be permanently held, thereby blocking workload that requires the task.

In view of the above, resource contention monitoring and analysis can be significant functions in today's computing environments.

DISCLOSURE OF THE INVENTION

In certain systems, resource serialization managers have an ability to report on resource contention, and document blocking requests and waiting requests for resources. However, such systems do not provide for any intelligent ordering of the assembled information. For example, the current GRS implementation assembles the contended resources in alphabetical order of resource name. Thus, provided herein is an enhanced approach wherein blocking requests and waiting requests are explicitly listed in a time-based manner.

Briefly summarized then, this invention comprises in one aspect a method for monitoring resource contention in a computing environment. This method includes: identifying contention between multiple processes for a resource; responsive to the identifying, listing a blocking process of the multiple processes in at least one blocking queue, this listing of the blocking process comprising ordering the blocking process in a time-based manner in the blocking queue; and further responsive to the identifying, listing a waiting process of the multiple processes in at least one waiting queue, this listing of the waiting process comprising ordering the waiting process in a time-based manner in the waiting queue.

In another aspect, this invention comprises a method for monitoring resource contention in a computing environment. The method includes: identifying contention between multiple processes for a resource; and building at least one blocking queue with each blocking process of the multiple processes listed in a time-based priority therein, and building at least one waiting queue with each waiting process of said multiple processes listed in a time-based priority therein.

Systems and computer program products corresponding to the above-summarized methods are also described and claimed herein.

To restate, provided herein is an enhanced resource contention analysis technique which provides an ability to readily report on: (1) tasks (and resources) that have been blocking requests for the longest period of time; (2) tasks (and resources) that have been waiting for the longest period of time; and (3) tasks (and resources) involved in a request dependency chain, and whether or not that chain represents a deadlock. With the information provided by the enhanced contention analysis disclosed herein, an installation can determine if a high volume of contention is actually a problem or not. If the contention is a problem, then the tasks involved in that contention are apparent, allowing the installation to take action against a task, subsystem, or system, to alleviate the problem. With the current art, a customer would have to take the output from multiple instances of the contention display to determine whether or not the systems are making progress and then by hand build the dependency graph, and determine which resources and tasks are at fault. Obviously, the problem is nearly insolvable when hundreds of resources and tasks are involved in contention.

As noted, the blocker and waiter lists disclosed herein comprise lists sorted by the time of the event (i.e., the longest blocker or waiter is at the head of the list). The advantages of this approach are that:

(1) Finding the most effected resource/request is simplified. The element at the front of the list is the request that has been blocking/waiting (depending on the list) for the longest period of time. This means that an analysis of the resources does not have to query the state of all resources. Generally, only a very small number of resources (<<1%) are in contention at any one time.

(2) Deadlock analysis is simplified. Without maintaining a separate list of requests in contention, a complete search of the resource requests would be required to determine if a blocking request is, in turn, blocked by another, associated resource request. With the list, it is simple to interrogate a blocked request, go to the front of the resource request list containing the request to find the blocker, then go up to that blocker's unit of work waiter list to see if that unit of work is blocked. This reduces the search time, since rather than interrogating every request from a task, the existence of an element indicates the oldest waiting request from a particular task.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 1 is a simplified view of a computing environment with an operating system employing a global resource serialization (GRS) component having blocker and waiter queues in accordance with the principles of the present invention;

FIG. 3 depicts a resource queue having a queue control block (QCB) for resource A and a queue element (QEL) (i.e., request) from task 1 for resource A indicating that the request for resource A is a request for shared access (SHR);

FIG. 4 depicts the resource queue of FIG. 3 with the subsequent addition of a request by a second task for shared access to resource A;

BEST MODE FOR CARRYING OUT THE INVENTION

Figure 2:
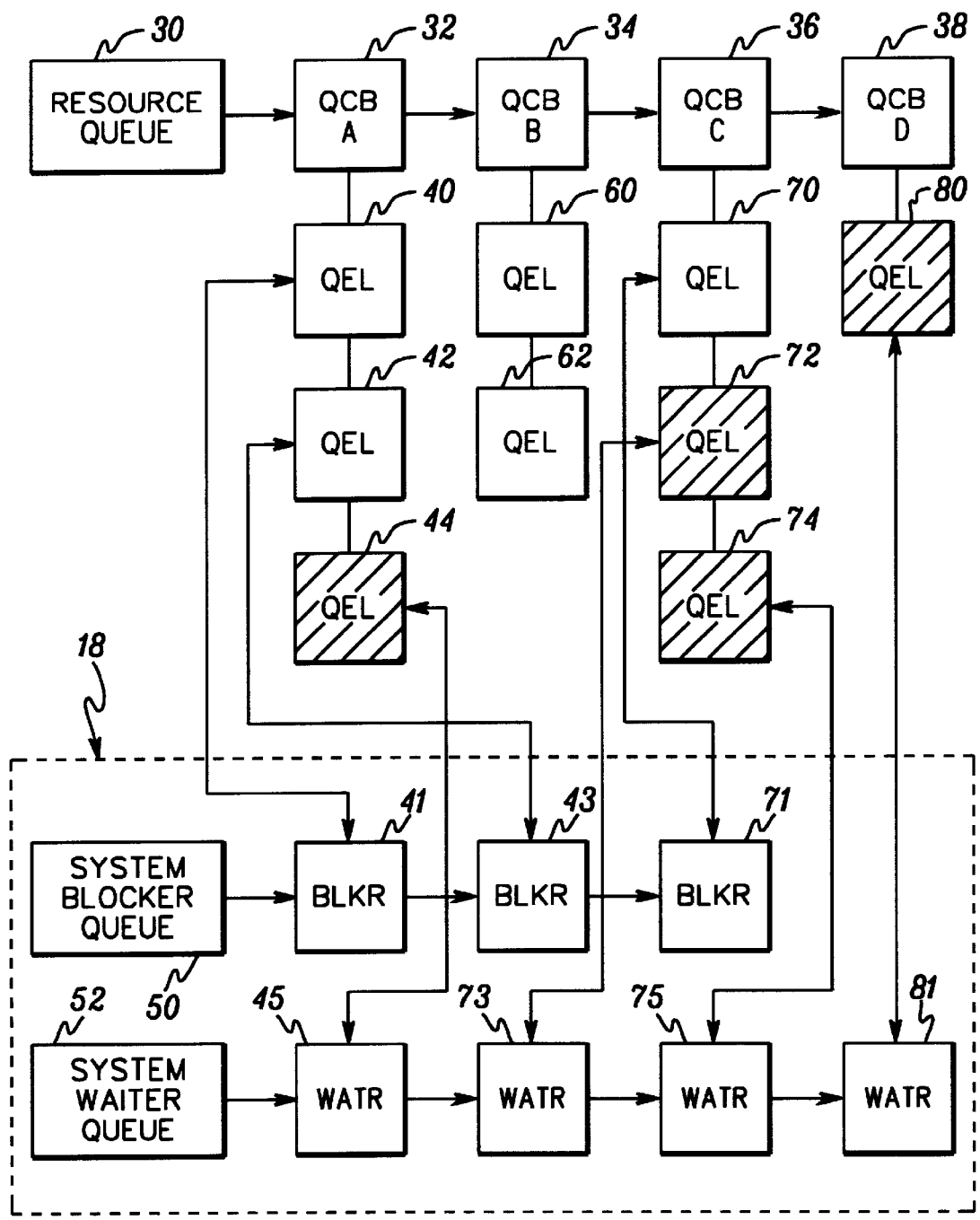
FIG. 2 depicts different examples of resource contention in a computing environment wherein certain queue elements (QELs) comprise blocking requests and others (which are cross-hatched) comprise waiting requests, and wherein a system blocker queue and a system waiter queue are provided in accordance with the principles of the present invention.

In the context of this application, the following terms include the meanings set forth below:

QCB—Queue Control Block. A queue control block represents a single resource. It contains the anchor for the resource queue of requests for that resource.

QEL—Queue Element. A queue element represents a single resource request from a process. QELs are chained to QCBs in first-in/first-out (FIFO) order in the resource queue.

CQE—Contention Queue Element. A contention queue element is generated for each resource request that is involved in contention. Associated CQEs are cross-linked to the QEL for the resource request. There are two kinds of CQEs, blocker CQE's and waiter CQEs. Each blocker CQE is chained, in age (FIFO) order (oldest first), onto one or more blocker queues, for instance a System Blocker Queue, Address Space Blocker Queue for the requester's address space, and a matching Task Related Blocker Queue for the requester's address space and TCB (Task Control Block) address. Each waiter CQE is chained, in age (FIFO) order (oldest first), onto one or more waiter queues, for instance a System Waiter Queue, Address Space Waiter Queue for the requester's address space and a matching Task Related Waiter Queue for the requester's address space and TCB (Task Control Block) address. As used herein, requests are "task related" if they arise from a common task or process.

System Blocker Queue—A queue of CQEs representing all of the requests on the system that are blocking access to resources. There is a single System Blocker Queue on each system in the multi-system complex.

Address Space Blocker Queue—A queue of CQEs representing all of the requests from a particular address space that are blocking access to resources. There is one Address Space Blocker Queue for each address space on a system in a multi-system complex.

Task Related Blocker Queue—A queue of CQEs representing all of the requests from a particular TCB address hash class in a particular address space that are blocking access to resources. In one example, there are 16 Task Related Blocker Queues for each address space on a system of a multi-system complex. The hash class for a particular TCB can be determined, for example, by bits 24–27 of the address of the TCB associated with the requester. (Also, note that there are analogous waiter queues, one System Waiter Queue, one Address Space Waiter Queue per address space, and 16 Task Based Waiter Queues per address space in each system).

Address Space—a contiguous memory space shared by a set of related processes. Each address space is identified in one example by a 16-bit hexadecimal number.

Task—a process that executes within an address space. There may be many tasks executing in parallel in a single address space. Each Task is identified by a Task Control Block (TCB) which resides in storage in the address space. Each TCB within an address space is uniquely identified by its TCB address. A task or process can make one or more requests for access to one or more resources. Thus, at any time requests from a common task may comprise both a blocking request and a waiting request. As used herein, requests are "associated" if they arise from a common task.

In accordance with the principles of the present invention, resource contention is tracked at the task level when contention occurs. Specifically, when a resource goes into contention, each of the owners of the resource is reflected in a blocker list and each of the waiters is reflected in a waiter list. Each list is ordered on a first-in/first-out basis (i.e., oldest to newest), with each instance of new contention being added to the end of the appropriate list. The resource requests and contention events are cross-linked to provide easy coordination between the resource queue(s) and the contention lists implemented in accordance with the principles of the present invention.

The concepts disclosed herein can be implemented within many different computing environments, including a single system environment and a multi-system environment. One example of a computing environment incorporating and using the resource contention monitoring and analysis capability of the present invention is depicted in FIG. 1. Referring to FIG. 1, a computer environment 10 includes, for instance, a central processing unit 12, a main storage (not shown) and one or more input/output devices (also not shown).

As is known, central processing unit (CPU) 12 is the controlling center of computing unit 10 and provides the sequencing and processing facilities for instruction execution, interruption action, timing functions, initial program loading and other machine related functions. The central processing unit executes at least one operating system 14, which as known, is used to control the operation of the computing unit by controlling the execution of other programs, controlling communication with peripheral devices and controlling use of the computer resources. Within operating system 12 is a resource serialization component 16 (such as the above-discussed Global Resource Serialization (GRS) component) which serializes access to system resources. In accordance with the principles of the present invention, GRS 16 includes multiple contention lists, herein referred to as "blocker queues" 20 and "waiter queues" 22.

In one example, computer environment 10 is a single system environment, which includes a OS/390 computer system running an AIX operating system (OS/390 and AIX are offered by International Business Machines Corporation). The invention is not limited to such an environment, however. The capabilities of the present invention can be incorporated and used within many types of computer environments and many types of computer systems. For example, computer environment 10 could include a UNIX workstation running a UNIX-based operating system. Alternatively, the operating system could include the Multiple Virtual Storage (MVS) operating system offered by International Business Machines Corporation. Further, the computing environment could comprise a multi-system environment such as a large parallel system with a plurality of units coupled to one another via a network connection, such as a switch. All of these types of computing environments are considered within the scope of the present invention.

A resource serialization component is present on most computing environments which do resource management. The above-referenced GRS component is one example of a resource serialization component. As shown in FIG. 2, these components typically employ a resource queue 30 for tracking requests to various resources of the environment. In this example, the resource queue includes a queue control block (QCB) for resource A 32, a QCB for resource B 34, a QCB for resource C 36, and a QCB for resource D 38. Associated with each QCB 32, 34, 36 & 38 is a resource request list which includes one or more resource requests from one or more tasks processing within the computing environment. These task requests are represented within FIG. 2 as queue elements (QELs). Thus, QELs 40, 42 & 44 comprise requests for resource A, QELs 60 & 62 comprise requests for resource B, QELs 70, 72 & 74 comprise requests for resource C, and QEL 80 is a request for resource D. Further, in this example the cross-hatched QELs 44, 72, 74 & 80 are assumed to comprise waiting requests as explained further below.

In accordance with the principles of the present invention, one or more queues 18 (comprising in this example a system blocker queue 50 and a system waiter queue 52) are added. As noted above, in addition to the system blocker queues, lists are preferably built at the address space and task level as well so that there would also be an address space blocker queue, an address space waiter queue, a task related blocker queue and a task related waiter queue. All requests that are involved in contention are listed in these blocker and waiter queues. For example, QEL 40 and QEL 42 are assumed to be blocking QEL 44. Since QEL 40 precedes QEL 42, blocking contention queue elements (BLKR) 41 & 43, respectively, are constructed and placed in system blocker queue 50. A waiting contention queue element (WATR) 45 corresponding to QEL 44 is placed in system waiter queue 52. Note that if the address space queues and task level queues are also implemented, then the contention queue elements would also be placed into these queues.

In one example, there is one system blocker queue and one system waiter queue per system, and a user specified number n of address space blocker queues and address space waiter queues (with a limit being one per possible address space) and 16×n task related blocker queues and task related waiter queues. Those skilled in the art will note, however, that there is no limit on the number of tasks which can be in an address space.

Although preferably comprising the three types of blocker queues and waiter queues noted herein, those skilled in the art should recognize that the concepts could be employed in combination with only one type of blocker and waiter queue, such as the system blocker queue and system waiter queue depicted in FIG. 2.

The contention queue element (CQE), whether comprising a blocker element or a waiter element, would share the same control block. The only difference in implementation would be that the header of the control block would be different. The control block, i.e., contention queue element, provides a status indicator on whether it is a blocker or a waiter element, as well as the address space that it is blocking or waiting on, the tasks that it is blocking or waiting on and a pointer back to the request element itself (QEL) which originated the CQE. Therefore if looking at one List, it is possible to find the corresponding entry in the other list.

Note that there is one resource queue 30 per system. (As used herein, a system may comprise a one-operating system image.) However, certain resources on the resource queue represent resources that are shared between systems in a multi-system environment. Systems that share resources will have the same image of the queue control block. The queue control blocks (QCBs) are arranged in hash value order.

When a resource request causes contention, a WATR contention queue element is built for that request. In addition, the other QELs in the resource queue are examined for all owners of the resource and the BLKR CQEs are constructed for those QELs.

FIGS. 3–8 depict an operational example of certain resource contention monitoring and analysis capabilities of the present invention. In FIG. 3, a new resource A is allocated as represented by queue control block (QCB) A 100 within the resource queue. A first request for resource A is received as represented by queue element (QEL) 102 originating with task 1. This request for resource A is a request for shared access to resource A. In FIG. 4 a QEL 104 from task 2 is added. This request is also for shared access to resource A such that, at this time, QEL 102 and QEL 104 together are owners of resource A.

Figure 5:
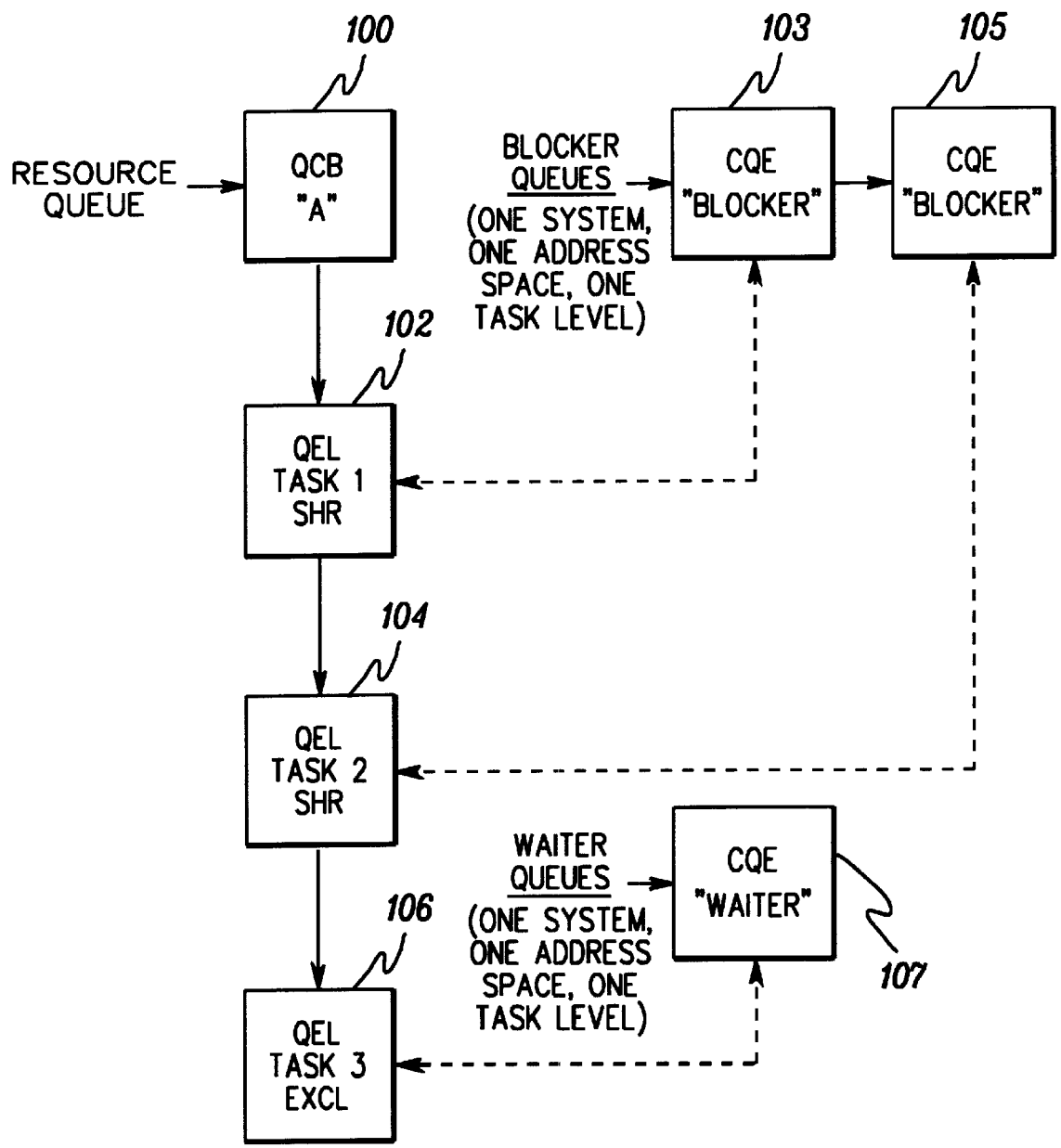
FIG. 5 depicts the resource queue of FIG. 4 after a third task has requested exclusive access to resource A, thereby defining contention for resource A and initiating placement of contention queue elements (CQEs) in one or more blocker queues and one or more waiter queues in accordance with the principles of the present invention.

In FIG. 5, resource A goes into contention since QEL 106 issued by task 3 is a request for exclusive access to resource A. Therefore, resource requests (QELs) that are blocking and resource requests that are waiting are gathered into control blocks, i.e., contention queue elements (CQEs), and placed onto queues, referred to herein as blocker queues and waiter queues, in age order (i.e., with the oldest first). In the embodiment of FIG. 5, each CQE is placed onto a system queue, an address space queue, and a task-hash queue according to whether the CQE comprises a blocker or a waiter.

There is a single system waiter queue and a single system blocker queue on each system in the computing environment. Every time a contention event occurs, a new CQE is placed at the end of the respective queue. Also, in one embodiment, there is one address space waiter queue and one address space blocker queue for each address space on a particular system. Each CQE is also queued to the address space queue related to the unit of work that it represents. Additionally, there are (in one example) 16 task related waiter and 16 task related blocker queues associated with each address space. Each CQE is also queued to the task related queue related to the address space and hash value obtained from the TCB (task control block) associated with the unit of work that it represents.

Since, QELs 102 and 104 comprise resource requests that are blocking QEL 106, QEL 106 comprises a resource request that is waiting. CQEs 103 & 105 are constructed corresponding to QELs 102 & 104 and placed in a time-based manner from oldest to newest (first-in/first-out) on one or more blocker queues, such as the system blocker queue, address space blocker queue and task related blocker queues discussed herein. Similarly, a waiter CQE 107 is constructed corresponding to QEL 106. This CQE 107 is placed on one or more waiter queues, such as the system waiter queue, address space waiter queue and task-hash waiter queue.

Figure 6:
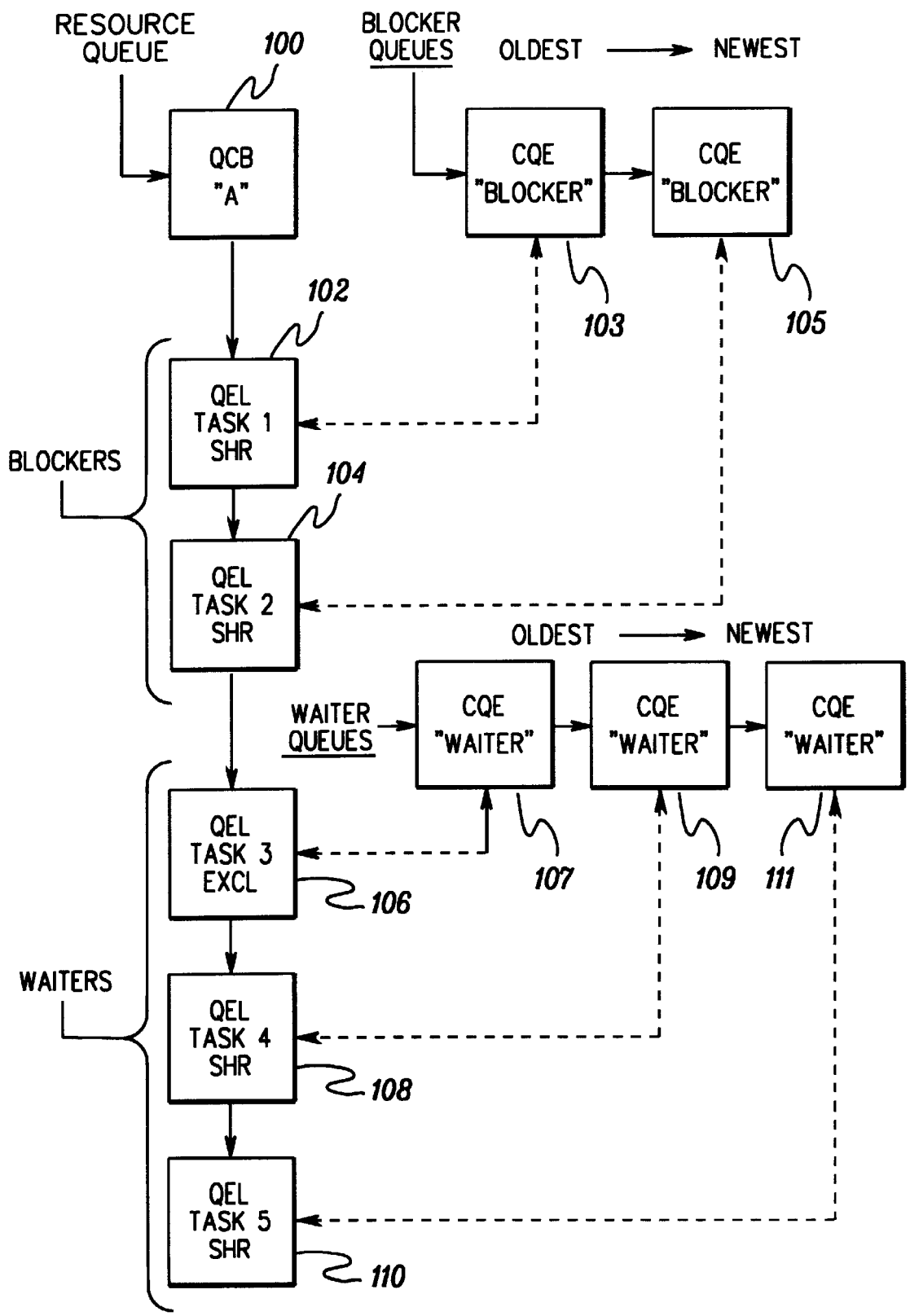
FIG. 6 depicts the resource queue of FIG. 5, wherein task 4 and task 5 have made requests for shared access to resource A, and showing the construction of contention queue elements (CQEs) corresponding to those requests in the waiter queue(s)

In FIG. 6, two more resource A requests are received. These requests, represented by QELs 108 & 110, comprise requests for shared access to resource A and are from a task 4 (108) and a task 5 (110). In accordance with the principles of the present invention, corresponding CQEs 109 & 111 are constructed for the waiter queues. These new requests for shared access to resource A are waiters since they are received subsequent to the exclusive access request represented by QEL 104. Again, the constructed CQEs 109 & 111 are placed in the waiter queues in a first-in/first-out manner corresponding to the timing of the resource A request represented by QELs 108 & 110.

Figure 7:
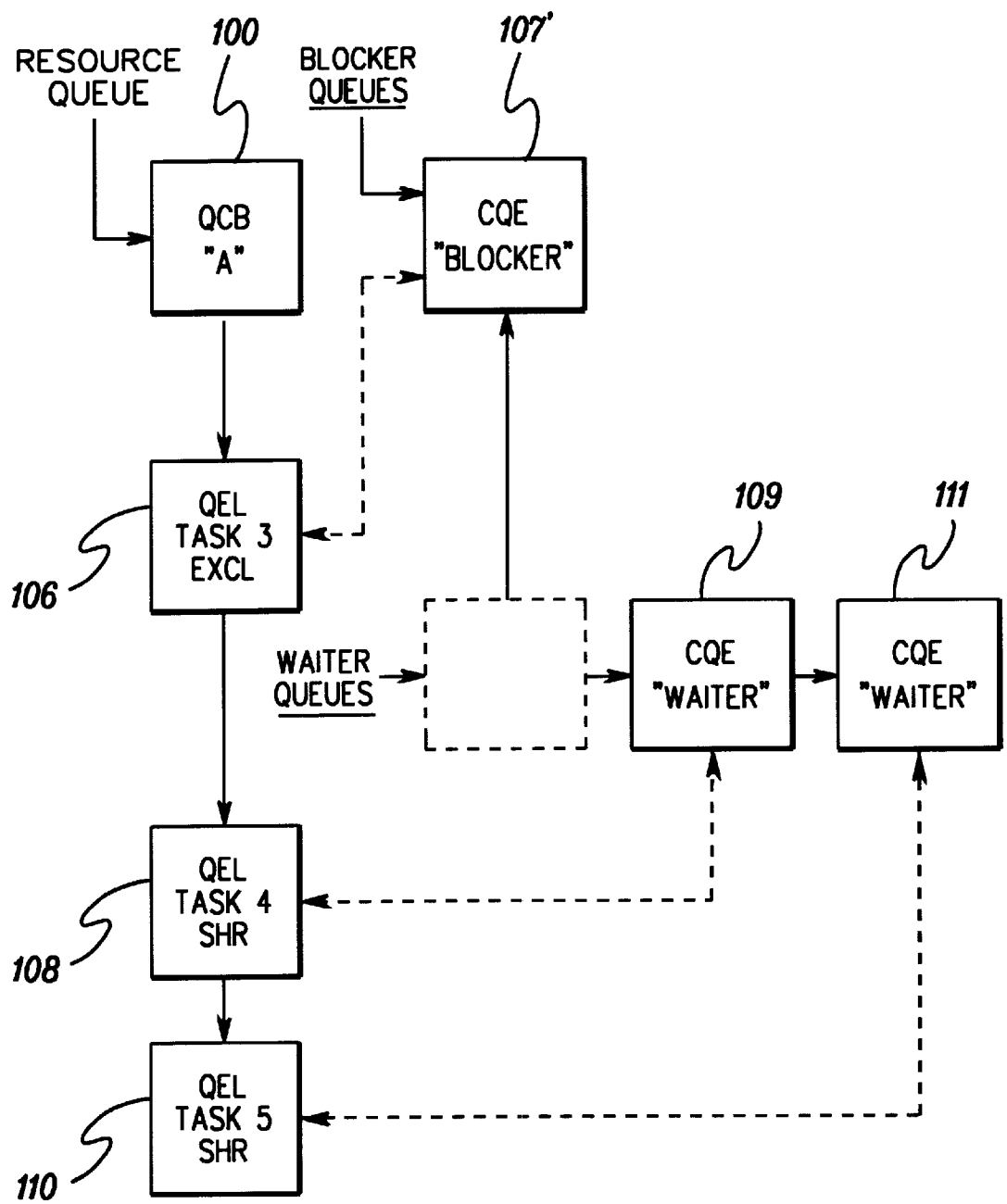
FIG. 7 depicts the resource queue of FIG. 6 after blocking tasks 1 & 2 have released ownership of resource A, showing transfer of the CQE for task 3 from the waiter queue(s) to the blocker queue(s) since the exclusivity of the task 3 request blocks the requests of tasks 4 & 5.

IN FIG. 7, task 1 and task 2 have been de-queued, (i.e., have released resource A) and task 3 now has become the exclusive owner and blocker for resource A. Thus, the CQE previously in the waiter queues is converted to a blocker CQE 107' and added to the blocker queue(s). Note that the prior blocker CQEs 103 & 105 (FIG. 6) have been dequeued with the release of resource A by task 1 and task 2. With the moving of the CQE corresponding to QEL 106 from the waiter queues to the blocker queues, only CQEs 109 & 111 remain on the waiter queues.

Figure 8:
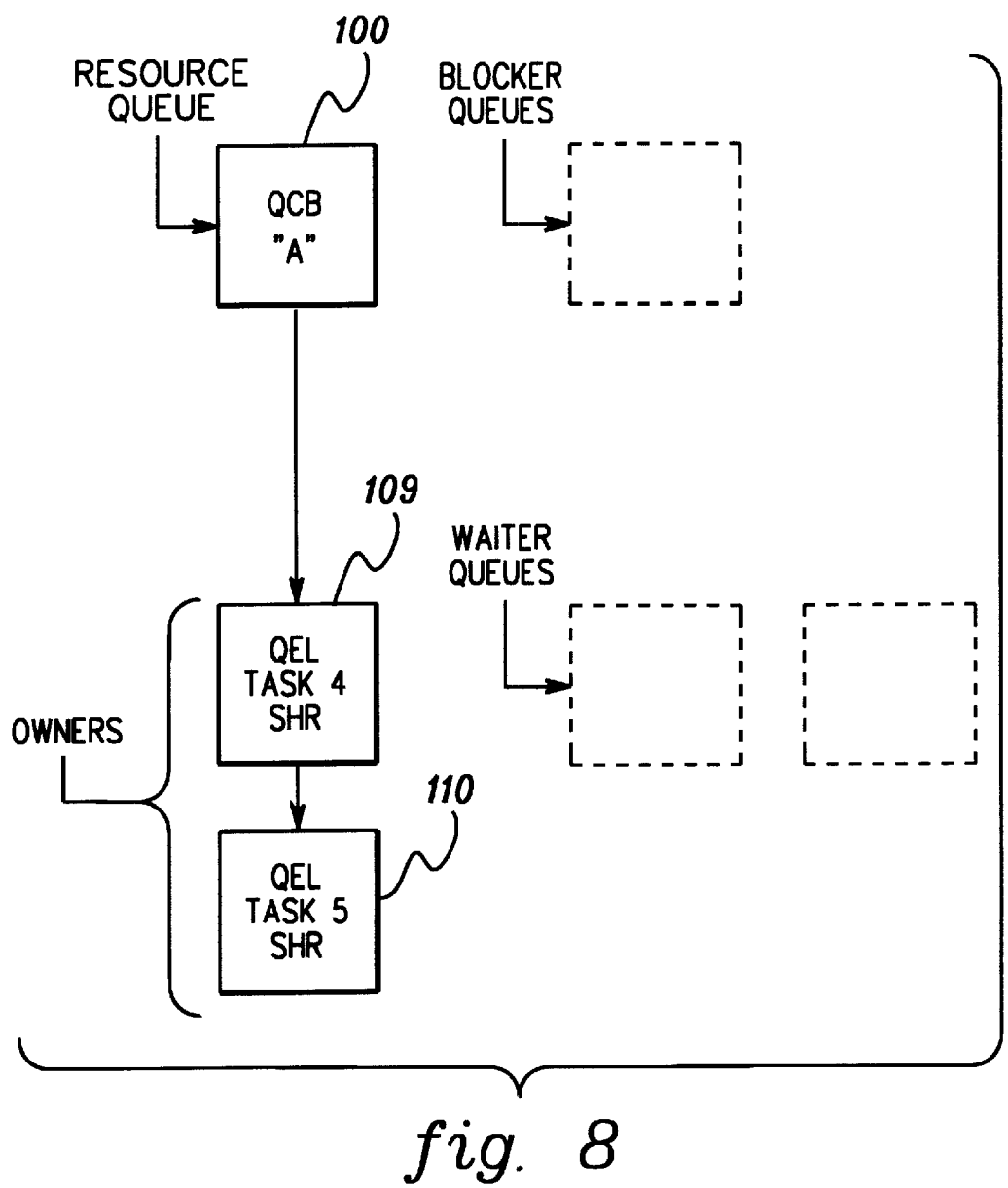
FIG. 8 depicts the resource queue of FIG. 7, after task 3 has released ownership of resource A, thereby eliminating resource contention since the task 4 and task 5 requests are for shared access to resource A.

In FIG. 8, task 3 has now been dequeued, and contention has ended since the resource A requests from task 4 and task each comprise requests for shared access to resource A. Therefore, QELs 108 & 110 become shared owners of the resource. All CQEs in the blocker queues and waiter queues are removed, thereby terminating the blocker and waiter chains.

It should be noted that the above-described queueing structure enables very rapid analysis of relationships between multiple resource requests. For example, if task 1 owns resource A, which task 2 is waiting for and task 2 owns resource B, which task 3 is waiting for, then there is a relationship (task 1 blocks task 3) that is useful to understand when trying to resolve resource allocation hangs. Without the new queues introduced by the contention monitoring and capabilities of the present invention, an analysis program would have to start with resource A, and determine that there is a blocker/waiter relationship (T1 blocks T2). Then to determine if task 2 is also in a blocking position, the program would have to do a search for all the resources that task 2 has requested. For each of these resources, the program would have to determine if there are any waiters for those resources.

Within the blocker and waiter queue structures presented herein, it is straightforward to determine the inter-task dependencies on resources. First, the program would query the system blocker list (or a lower level blocker list if a particular address space or task is specified). The first element on the chain is the longest blocker on that system. In general, resource lockouts can be identified by long-term blocking of a resource. By interrogating that CQE, the program can quickly determine the resource (by chaining to the QEL and QCB for the requested resource) and choose the waiter of interest. From that waiter, the program can identify the address space and task, to determine if that unit of work is a blocker for some other resource and continue the process until no further waiters are found. There is no need to search the entire resource set to get the next waiter, as the information is easily obtained from the information in the queues.

Similarly, the same procedure can be worked in reverse to run up a waiter dependency chain, starting with the waiter, a program can find the blocker for that resource, and see if that blocker is, itself, a waiter for another resource. Through this process, a program can also perform deadlock analysis quickly, by simply saving the set CQEs that have been visited during a traversal of a dependency chain. If a CQE is detected twice, a deadlock has been found. This is explained further below with reference to the process example of FIG. 9.

Figure 9:
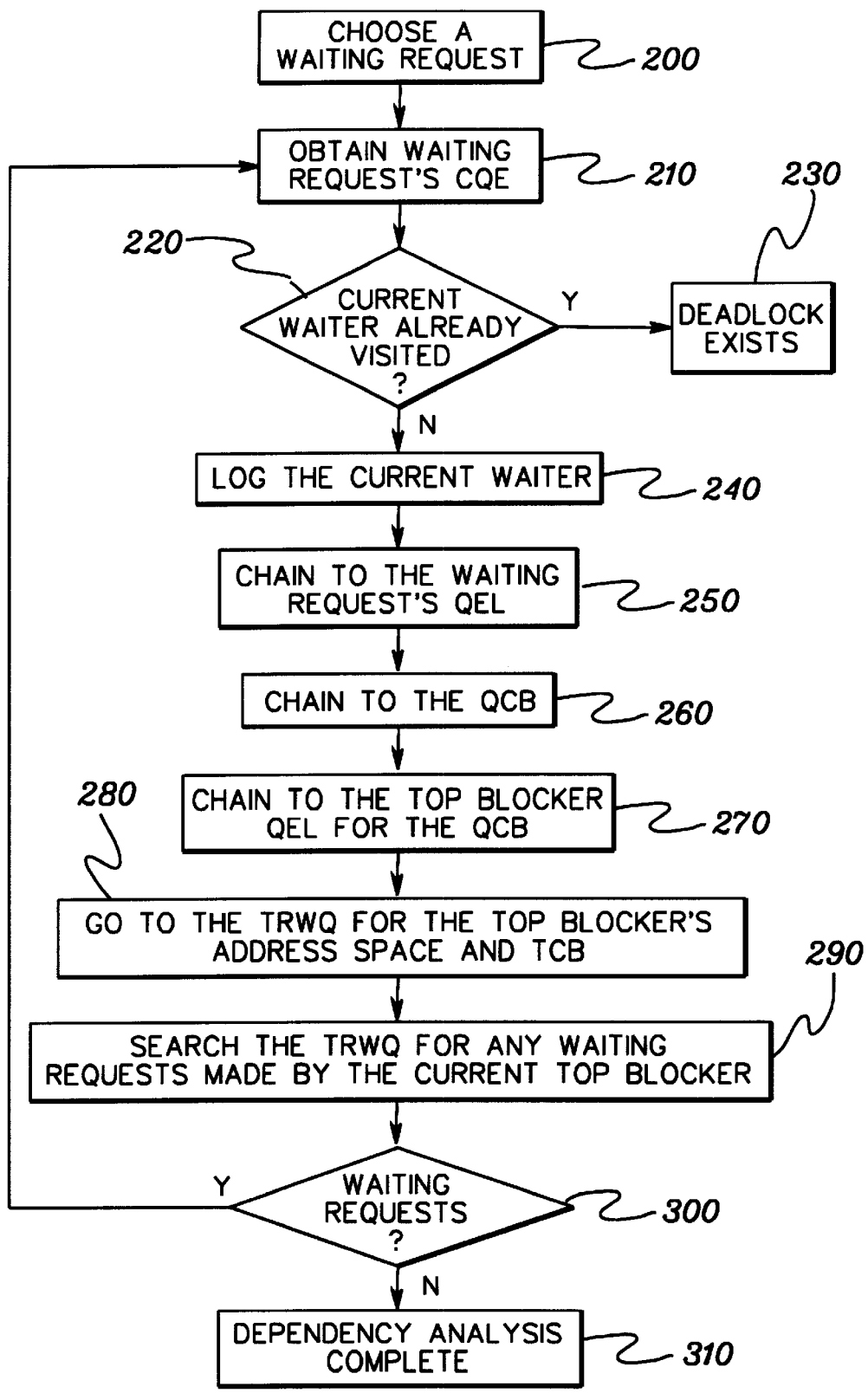
FIG. 9 is a flowchart of one embodiment of a contention analysis process in accordance with the principles of the present invention.

FIG. 9 depicts one embodiment of a resource contention analysis process in accordance with the principles of the present invention. This process assumes the existence of blocker queues and waiter queues such as described herein, including a task related waiter queue (TRWQ). Processing begins by choosing a current waiting request 200. Generally speaking, deadlocks will eventually become the longest lasting contention in a multi-system complex. Therefore, starting with the oldest waiter in the complex can be a useful starting point. The waiting request's contention queue element (CQE) is obtained 210 and identification of the waiter is reported. Next, processing determines whether the current waiter has already been visited by the analysis process 220. This entails checking information that has been previously logged to determine whether the current waiter has already been examined. If the current waiter has already been visited, then a deadlock condition exists 230 and the dependency analysis is complete. Otherwise, identification of the current waiter is logged 240 and processing links or chains to the waiting request's queue element (QEL) 250 in the resource queue. From this queue element, processing chains upward to the queue control block (QCB) for the resource 260. After obtaining the resource information, processing jumps to the top blocker in the chain for the QCB 270. The top blocker is the request that has owned the resource the longest. Based on the same assumptions, it is most likely that the request is part of a deadlocked set of requests.

Once the top blocker QEL is established, processing, in this example, goes to the task related waiter queue (TRWQ) for the top blocker's address space and task control block (TCB) 280. The TRWQ is searched for any waiting request made by or "associated with" the current top blocker 290 and processing determines whether there are any related waiting requests 300. If so, processing loops back to obtain the related waiting request's CQE 210. Otherwise, the dependency analysis is complete and the top blocker is not waiting 310.

An example of what this analysis would look like follows:

No deadlock case:
 Waiter: Process 1
 Resource: A
 Blocker: Process 2
 Waiter: Process 2
 Resource: B
 Blocker Process 3
 . . .
 Waiter: Process 15
 Resource: R
 Blocker: Process 16
Analysis ended: Process 16 is not waiting Deadlock case:
 Waiter: Process 1
 Resource: A
 Blocker: Process 2
 Waiter: Process 2
 Resource: B
 Blocker: Process 3
 . . .
 Waiter Process 15
 Resource: R
 Blocker: Process 16
 Waiter: Process 16
 Resource: S
 Blocker: Process 1
Analysis ended: A deadlock has been detected Those skilled in the art will note from the above description that the present invention can be included, for example, in an article of manufacture (e.g., one or more computer program products) having, for instance, computer usable media. This media can have embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for monitoring resource contention in a computing environment, said method comprising:

identifying an instance of contention between multiple processes for a resource;

responsive to said identifying, listing a blocking process of said multiple processes in at least one blocking queue, said listing of said blocking process comprising time ordering said blocking process in said blocking queue relative to at least one other blocking process for at least one other resource of the computing environment, said time ordering meaning that a longest blocking process in time across multiple resources of the computing environment is listed at a front of said blocking queue and a shortest blocking process in time across the multiple resources is listed at a back of said blocking queue, said blocking process being added to said back of said at least one blocking queue with identifying of said instance of contention irrespective of whether said blocking process is already listed in said at least one blocking queue responsive to identifying of a prior instance of contention;

further responsive to said identifying, listing a waiting process of said multiple processes in at least one waiting queue, said listing of said waiting process comprising time ordering said waiting process in said waiting queue relative to at least one other waiting process for at least one other resource of the computing environment, said time ordering meaning that a longest waiting process in time across multiple resources of the computing environment is listed at a front of said waiting queue and a shortest waiting process in time across the multiple resources is listed at a back of said waiting queue, said waiting process being added to said back of said at least one waiting queue with identifying of said instance of contention irrespective of whether said waiting process is already listed in said at least one waiting queue responsive to identifying of a prior instance of contention; and wherein contention across multiple resources of the computing environment can be monitored employing the time ordered blocking queue and the time ordered waiting queue without requiring querying of the states of the multiple resources of the computing environment.

2. The method of claim 1, wherein said time ordering of said blocking process in said at least one blocking queue comprises listing said blocking process relative to said at least one other blocking process in said at least one blocking queue in a first-in/first-out order, and wherein said time ordering of said waiting process in said at least one waiting queue comprises ordering said waiting process in said at least one waiting queue in a first-in/first-out order relative to said at least one other waiting process.

3. The method of claim 1, further comprising updating at least one blocking queue or waiting queue with receipt of a new process request for said resource or a de-queueing of a process request for said resource while said resource is in contention.

4. The method of claim 1, wherein said at least one blocking queue comprises at least one of a system blocker queue, an address space blocker queue and a task related blocker queue, and wherein said at least one waiting queue comprises at least one of a system waiter queue, an address space waiter queue, and a task related waiter queue.

5. The method of claim 1, wherein said at least one blocking queue comprises multiple blocking queues, said multiple blocking queues comprising at least one of a system blocker queue, an address space blocker queue and a task related blocker queue, and wherein said at least one waiting queue comprises at least one of a system waiter queue, an address space waiter queue and a task related waiter queue.

6. The method of claim 5, wherein said at least one blocking queue comprises each of said system blocker queue, address space blocker queue, and task related blocker queue, and wherein said at least one waiting queue comprises each of said system waiter queue, address space waiter queue and task related waiter queue, and wherein said listing of said blocking process comprises listing said blocking process in at least one of said system blocker queue, address space blocker queue and task related blocker queue, and wherein said listing of said waiting process comprises listing said waiting process in at least one of said system waiter queue, address space waiter queue and task related waiter queue.

7. The method of claim 1, further comprising identifying an oldest blocking process in contention using processes listed in said at least one blocking queue.

8. The method of claim 7, wherein said oldest blocking process comprises a first listed process in said at least one blocking queue.

9. The method of claim 1, further comprising identifying a longest waiting process in contention using processes listed in said at least one waiting queue.

10. The method of claim 9, wherein said oldest waiting process comprises a first listed process in said at least one waiting queue.

11. The method of claim 1, wherein said listing of said blocking process in said at least one blocking queue and said listing of said waiting process in said at least one waiting queue each comprise linking said listing to a resource request in a resource queue for said resource.

12. A method for monitoring resource contention in a computing environment, said method comprising:

identifying multiple instances of contention between multiple processes for multiple resources;

building at least one blocking queue with each blocking process of said multiple processes listed in time-based priority therein, said time-based priority meaning that a longest blocking process in time across the multiple resources is listed at a front of said at least one blocking queue and a shortest blocking process in time across the multiple resources is listed at a back of said at least one blocking queue, each blocking process being added to said back of said at least one blocking queue with identifying of a respective instance of contention of said multiple instances of contention irrespective of whether said blocking process is already listed in said at least one blocking queue responsive to identifying of a prior instance of contention, and building at least one waiting queue with each waiting process of said multiple processes listed in time-based priority therein, said time-based priority meaning that a longest waiting process in time across the multiple resources is listed at a front of said at least one waiting queue and a shortest waiting process in time across the multiple resources is listed at a back of said at least one waiting queue, each waiting process being added to said back of said at least one waiting queue with identifying of a respective instance of contention of said multiple instances of contention irrespective of whether said waiting process is already listed in said at least one waiting queue responsive to identifying of a prior instance of contention; and wherein contention across multiple resources of the computing environment can be monitored employing the time ordered blocking queue and the time ordered waiting queue without requiring querying of the states of the multiple resources of the computing environment.

13. The method of claim 12, wherein said building of said at least one blocking queue comprises linking each listing in said at least one blocking queue to a corresponding request in a resource queue of multiple resource queues for said multiple resources, and wherein said building of said at least one waiting queue comprises linking each listing in said at least one waiting queue to a corresponding request in a resource queue of said multiple resource queues.

14. The method of claim 12, further comprising automatically updating at least one blocking queue or waiting queue with receipt of a new process request for a resource of said multiple resources or a de-queueing of a process request for a resource of said multiple resources while said resource is in contention.

15. A system for monitoring resource contention in a computing environment, said system comprising:

means for identifying an instance of contention between multiple processes for a resource;

means for listing a blocking process of said multiple processes in at least one blocking queue responsive to identifying of said contention, said means for listing of said blocking process comprising means for time ordering said blocking process in said blocking queue relative to at least one other blocking process for at least one other resource of the computing environment, said time ordering meaning that a longest blocking process in time across multiple resources of the computing environment is listed at a front of said blocking queue and a shortest blocking process in time across the multiple resources is listed at a back of said blocking queue, said blocking process being added to said back of said at least one blocking queue with identifying of said instance of contention irrespective of whether said blocking process is already listed in said at least one blocking queue responsive to identifying of a prior instance of contention;

means for listing a waiting process of said multiple processes in at least one waiting queue responsive to identifying of said contention, said means for listing of said waiting process comprising means for time ordering said waiting process in said waiting queue relative to at least one other waiting process for at least one other resource of the computing environment, said time ordering meaning that a longest waiting process in time across multiple resources of the computing environment is listed at a front of said waiting queue and a shortest waiting process in time across the multiple resources is listed at a back of said waiting queue, said waiting process being added to said back of said at least one waiting queue with identifying of said instance of contention irrespective of whether said waiting process is already listed in said at least one waiting queue responsive to identifying of a prior instance of contention; and wherein contention across multiple resources of the computing environment can be monitored employing the time ordered blocking queue and the time ordered waiting queue without requiring querying of the states of the multiple resources of the computing environment.

16. The system of claim 15, wherein said means for time ordering said blocking process comprises means for listing said blocking process relative to said at least one other blocking process in said at least one blocking queue in a first-in/first-out order, and wherein said means for time ordering said waiting process comprises means for ordering said waiting process in said at least one waiting queue in a first-in/first-out order relative to said at least one other waiting process.

17. The system of claim 15, further comprising means for automatically updating at least one blocking queue or waiting queue with receipt of a new process request for said resource or a de-queueing of a process request for said resource while said resource is in contention.

18. The system of claim 15, wherein said at least one blocking queue comprises at least one of a system blocker queue, an address space blocker queue and a task related blocker queue, and wherein said at least one waiting queue comprises at least one of a system waiter queue, an address space waiter queue, and a task related waiter queue.

19. The system of claim 15, wherein said at least one blocking queue comprises multiple blocking queues, said multiple blocking queues comprising at least one of a system blocker queue, an address space blocker queue and a task related blocker queue, and wherein said at least one waiting queue comprises at least one of a system waiter queue, an address space waiter queue and a task related waiter queue.

20. The system of claim 15, further comprising means for identifying an oldest blocking process in contention using processes listed in said at least one blocking queue.

21. The system of claim 20, wherein said oldest blocking process comprises a first listed process in said at least one blocking queue.

22. The system of claim 15, further comprising means for identifying a longest waiting process in contention using processes listed in said at least one waiting queue.

23. The system of claim 22, wherein said oldest waiting process comprises a first listed process in said at least one waiting queue.

24. The system of claim 15, wherein said means for listing said blocking process in said at least one blocking queue and said means for listing said waiting process in said at least one waiting queue each comprise means for linking said listing to a resource request in a resource queue for said resource.

25. A system for monitoring resource contention in a computing environment, said system comprising:

a computing unit adapted to identify an instance of contention between multiple processes for a resource, said computing unit including a resource serialization component configured for:

listing a blocking process of said multiple processes in at least one blocking queue, said listing of said blocking process comprising time ordering said blocking process in said blocking queue relative to at least one other blocking process for at least one other resource of the computing environment, said time ordering meaning that a longest blocking process in time across multiple resources of the computing environment is listed at a front of said blocking queue and a shortest blocking process in time across the multiple resources is listed at a back of said blocking queue, said blocking process being added to said back of said at least one blocking queue with identifying of said instance of contention irrespective of whether said blocking process is already listed in said at least one blocking queue responsive to identifying of a prior instance of contention;

listing a waiting process of said multiple processes in at least one waiting queue, said listing of said waiting process comprising time ordering said waiting process in said waiting queue relative to at least one other waiting process for at least one other resource of the computing environment, said time ordering meaning that a longest waiting process in time across multiple resources of the computing environment is listed at a front of said waiting queue and a shortest waiting process in time across the multiple resources is listed at a back of said waiting queue, said waiting process being added to said back of said at least one waiting queue with identifying of said instance of contention irrespective of whether said waiting process is already listed in said at least one waiting queue responsive to identifying of a prior instance of contention; and wherein contention across multiple resources of the computing environment can be monitored employing the time ordered blocking queue and the time ordered waiting queue without requiring querying of the states of the multiple resources of the computing environment.

26. A system for monitoring resource contention in a computing environment, said system comprising:

means for identifying multiple instances of contention between multiple processes for multiple resources;

means for building at least one blocking queue with each blocking process of said multiple processes listed in time-based priority therein, said time-based priority meaning that a longest blocking process in time across multiple resources of the computing environment is listed at a front of said at least one blocking queue and a shortest blocking process in time across the multiple resources is listed at a back of said at least one blocking queue, each blocking process being added to said back of said at least one blocking queue with identifying of a respective instance of contention of said multiple instances of contention irrespective of whether said blocking process is already listed in said at least one blocking queue responsive to identifying of a prior instance of contention; and for building at least one waiting queue with each waiting process of said multiple processes listed in time-based priority therein, said time-based priority meaning that a longest waiting process in time across multiple resources of the computing environment is listed at a front of said at least one waiting queue and a shortest waiting process in time across the multiple resources is listed at a back of said at least one waiting queue, each waiting process being added to said back of said at least one waiting queue with identifying of a respective instance of contention of said multiple instances of contention irrespective of whether said waiting process is already listed in said at least one waiting queue responsive to identifying of a prior instance of contention; and wherein contention across multiple resources of the computing environment can be monitored employing the time ordered blocking queue and the time ordered waiting queue without requiring querying of the states of the multiple resources of the computing environment.

27. The system of claim 26, wherein said means for building said at least one blocking queue comprises means for linking each listing in said at least one blocking queue to a corresponding request in a resource queue of multiple resource queues for said multiple resources, and wherein said means for building said at least one waiting queue comprises means for linking each listing in said at least one waiting queue to a corresponding request in a resource queue of said multiple resource queues.

28. The system of claim 26, further comprising means for automatically updating at least one blocking queue or waiting queue with receipt of a new process request for a resource of said multiple resources or a de-queueing of a process request for a resource of said multiple resources while said resource is in contention.

29. A system for monitoring resource contention in a computing environment, said system comprising:

a computing unit adapted to identify multiple instances of contention between multiple processes for multiple resources, said computing unit including a resource serialization component adapted to:

build at least one blocking queue with each blocking process of the multiple processes listed in a time-based priority therein, said time-based priority meaning that a longest blocking process in time across multiple resources of the computing environment is listed at a front of said at least one blocking queue and a shortest blocking process in time across the multiple resources is listed at a back of said at least one blocking queue, each blocking process being added to said back of said at least one blocking queue with identifying of a respective instance of contention of said multiple instances of contention irrespective of whether said blocking process is already listed in said at least one blocking queue responsive to identifying of a prior instance of contention; and build at least one waiting queue with each waiting process of the multiple processes listed in a time-based priority therein, said time-based priority meaning that a longest waiting process in time across multiple resources of the computing environment is listed at a front of said at least one waiting queue and a shortest waiting process in time across the multiple resources is listed at a back of said at least one waiting queue, each waiting process being added to said back of said at least one waiting queue with identifying of a respective instance of contention of said multiple instances of contention irrespective of whether said waiting process is already listed in said at least one waiting queue responsive to identifying of a prior instance of contention; and wherein contention across multiple resources of the computing environment can be monitored employing the at least one time ordered blocking queue and the at least one time ordered waiting queue without requiring querying of the states of the multiple resources of the computing environment.

30. At least one program storage device readable by a machine, tangibly embodying at least one program of instructions executable by the machine to perform a method for monitoring resource contention in a computing environment, comprising:

identifying an instance of contention between multiple processes for a resource;

responsive to said identifying, listing a blocking process of said multiple processes in at least one blocking queue, said listing of said blocking process comprising time ordering said blocking process in said blocking queue relative to at least one other blocking process for at least one other resource of the computing environment, said time ordering meaning that a longest blocking process in time across multiple resources of the computing environment is listed at a front of said blocking queue and a shortest blocking process in time across the multiple resources is listed at a back of said blocking queue, said blocking process being added to said back of said at least one blocking queue with identifying of said instance of contention irrespective of whether said blocking process is already listed in said at least one blocking queue responsive to identifying of a prior instance of contention;

further responsive to said identifying, listing a waiting process of said multiple processes in at least one waiting queue, said listing of said waiting process comprising time ordering said waiting process in said waiting queue relative to at least one other waiting process for at least one other resource of the computing environment, said time ordering meaning that a longest waiting process in time across multiple resources of the computing environment is listed at a front of said waiting queue and a shortest waiting process in time across the multiple resources is listed at a back of said waiting queue, said waiting process being added to said back of said at least one waiting queue with identifying of said instance of contention irrespective of whether said waiting process is already listed in said at least one waiting queue responsive to identifying of a prior instance of contention; and wherein contention across multiple resources of the computing environment can be monitored employing the time ordered blocking queue and the time ordered waiting queue without requiring querying of the states of the multiple resources of the computing environment.

31. At least one program storage device readable by a machine, tangibly embodying at least one program of instructions executable by the machine to perform a method for monitoring resource contention in a computing environment, comprising:

identifying multiple instances of contention between multiple processes for multiple resources;

building at least one blocking queue with each blocking process of said multiple processes listed in time-based priority therein, said time-based priority meaning that a longest blocking process in time across multiple resources of the computing environment is listed at a front of said at least one blocking queue and a shortest blocking process in time across the multiple resources is listed at a back of said at least one blocking queue, each blocking process being added to said back of said at least one blocking queue with identifying of a respective instance of contention of said multiple instances of contention irrespective of whether said blocking process is already listed in said at least one blocking queue responsive to identifying of a prior instance of contention and building at least one waiting queue with each waiting process of said multiple processes listed in time-based priority therein, said time-based priority meaning that a longest waiting process in time across multiple resources of the computing environment is listed at a front of said at least one waiting queue and a shortest waiting process in time across the multiple resources is listed at a back of said at least one waiting queue, each waiting process being added to said back of said at least one waiting queue with identifying of a respective instance of contention of said multiple instances of contention irrespective of whether said waiting process is already listed in said at least one waiting queue responsive to identifying of a prior instance of contention; and wherein contention across multiple resources of the computing environment can be monitored employing the at least one time ordered blocking queue and the at least one time ordered waiting queue without requiring querying of the states of the multiple resources of the computing environment.

\* \* \* \* \*